(12) United States Patent
Law

(10) Patent No.: US 12,479,356 B2
(45) Date of Patent: Nov. 25, 2025

(54) SYSTEM AND METHOD OF VEHICLE DIFFUSING REAR LIGHT

(71) Applicant: Calvin Law, Chino, CA (US)

(72) Inventor: Calvin Law, Chino, CA (US)

( * ) Notice: Subject to any disclaimer, the term of this patent is extended or adjusted under 35 U.S.C. 154(b) by 0 days.

(21) Appl. No.: 18/949,935

(22) Filed: Nov. 15, 2024

(65) Prior Publication Data

US 2025/0153631 A1    May 15, 2025

Related U.S. Application Data

(60) Provisional application No. 63/599,223, filed on Nov. 15, 2023.

(51) Int. Cl.

| | |
|---|---|
| *B60Q 1/30* | (2006.01) |
| *B60Q 1/26* | (2006.01) |
| *B60R 16/03* | (2006.01) |
| *B62D 35/00* | (2006.01) |
| *F21S 43/50* | (2018.01) |

(52) U.S. Cl.
CPC ............ *B60Q 1/30* (2013.01); *B60Q 1/2696* (2013.01); *B60R 16/03* (2013.01); *B62D 35/007* (2013.01); *F21S 43/50* (2018.01)

(58) Field of Classification Search
CPC ...... B60Q 1/3015; B60Q 1/30; B60Q 1/2696; F21S 43/50; B60R 16/03; B62D 35/007
See application file for complete search history.

(56) References Cited

U.S. PATENT DOCUMENTS

| | | | |
|---|---|---|---|
| 2016/0059774 A1* | 3/2016 | Crandall .............. | B60Q 1/2696 29/428 |
| 2018/0105100 A1* | 4/2018 | Erb ...................... | B60Q 1/2661 |
| 2018/0124362 A1* | 5/2018 | Kim ..................... | H04N 9/3179 |

FOREIGN PATENT DOCUMENTS

EP          0047793 A1 *   9/1980

OTHER PUBLICATIONS

Innovation q+ npl search (Year: 2024).*

* cited by examiner

*Primary Examiner* — Anabel Ton
(74) *Attorney, Agent, or Firm* — Alexander Chen, Esq.

(57) ABSTRACT

A rear light and diffuser apparatus comprising a housing, a light panel that is disposed on a side of the housing, diffuser fins that protrude perpendicular to the light panel and are disposed along the length of the rear light and diffuser apparatus in a fan-out design. The rear light and diffuser apparatus further comprises a power cord that is designed to fit a car's power supply.

6 Claims, 7 Drawing Sheets

SYSTEM AND METHOD OF VEHICLE DIFFUSING REAR LIGHT

INCORPORATION BY REFERENCE

This application is a non-provisional application of and claims the benefit of earlier filing date under 35 U.S.C. 119 (e) to the filing date of U.S. Application No. 63/599,223, entitled "Vehicle Diffusing Rear Light," filed on Nov. 15, 2023, and which is incorporated herein by reference in its entirety.

FIELD OF INVENTION

The present invention is directed to a vehicle diffusing system and method that reduces excessive drag and improves the downforce at the rear of the vehicle. Particularly, the present invention is directed to an aftermarket rear light that is also a diffuser.

BACKGROUND

The aftermarket, or the secondary market, of automotive parts and equipment, is concerned with the manufacturing, re-manufacturing, distribution, retailing, and installation of all vehicle parts, chemicals, equipment, and accessories, after the sale of the automobile by the original equipment manufacturer (OEM) to the consumers. The purchase of such aftermarket parts is a popular way for automobile enthusiasts to personalize their vehicles.

One of the most popular vehicle personalizations is the replacement of vehicle lamps. As a result, aftermarket lamps are popular parts. One such component is the vehicle's rear light, such as brake light, tail light, etc. Another popular vehicle personalization is the addition of a vehicle diffuser that works to improve the performance and aesthetics of the vehicle. A vehicle diffuser is an aerodynamic device that gradually increases the airflow's cross-sectional area under the car as it exits from beneath the vehicle. This creates a low-pressure zone under the car, which helps to suck the car down to the ground and increase downforce, which is the force that presses a car down onto the road, and it is crucial for improving handling and performance, especially at high speeds. In addition to generating downforce, diffusers can also help to reduce drag, which is the force that opposes the car's forward motion. By smoothing out the airflow under the car, diffusers can help to reduce drag and improve fuel efficiency.

However, it has previously been a complicated process for the user to modify and manage any such personalization, let alone two or multiple personalizations at once. Perhaps, the reason is that the current lights on the market are simplistically performing aesthetic and/or signaling functions, and the current diffusers only provide their aerodynamic improvement.

Thus, it is desirable for a solution that enables a user to personalize his vehicle with an aesthetics lamp that is also a diffuser to improve his car performance by adding an aerodynamic diffusion function to the lights.

OBJECTIVE OF THE INVENTION

It is an object of this invention to provide a solution for vehicle owners to easily modify and manage the aesthetics and performance of their vehicles at the same time.

It is also an object of this invention to provide an convenient aftermarket rear light and diffuser.

SUMMARY OF THE INVENTION

A rear light and diffuser apparatus comprises a housing, a light panel that is disposed on a side of the housing, diffuser fins that protrude perpendicular to the light panel and are disposed along a width of the rear light and diffuser apparatus in a fan-out design. The rear light and diffuser apparatus further comprises a power cord that is designed to fit a car's existing power supply.

The light panel comprises at least one of LED light reflector, halogen lamp reflector, and acetylene lamp reflector.

In one embodiment, the rear light panel comprises an ornamental element.

BRIEF DESCRIPTION

The present invention will be understood and appreciated more fully from the following detailed description taken in conjunction with the drawings in which.

DETAILED DESCRIPTION

The invention will be described in the context of a preferred embodiment.

Figure 1:
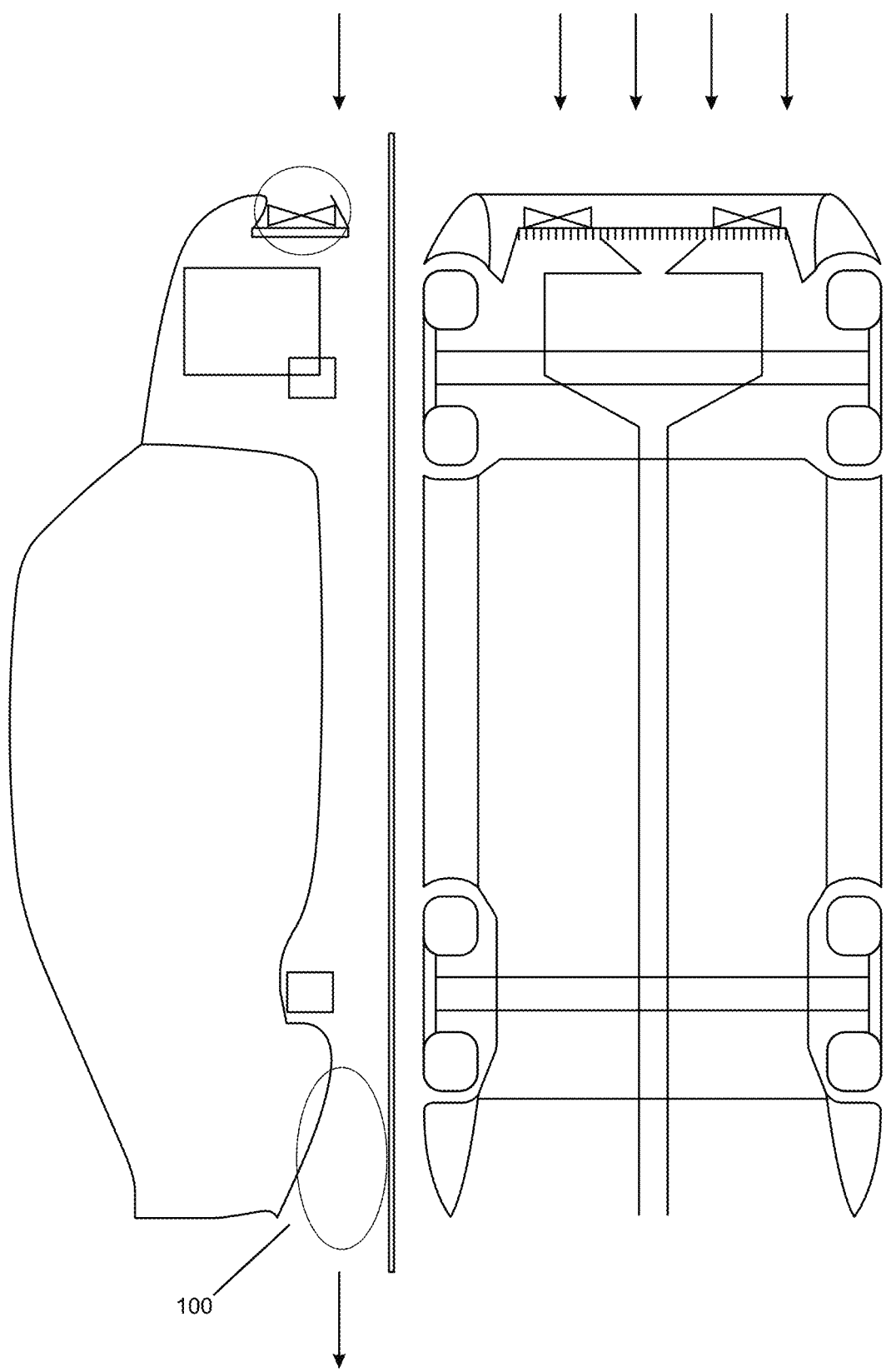
FIG. 1 illustrates and explains how an embodiment of the current invention changes and improves the aerodynamic properties of a vehicle.

A diffuser on a car is a shaped section of the car rear which improves the car's aerodynamic properties by enhancing the transition between the high-velocity airflow underneath the car and the much slower freestream airflow of the ambient atmosphere. It works by providing a space for the underbody airflow to decelerate and expand in volume so that it does not cause excessive flow separation and drag. The diffuser itself accelerates the air flow in front of it, which helps generate downforce. This is achieved by creating a change in velocity of the air flowing under the diffuser by giving it a rake angle which in turn generates a change in pressure and hence increases downforce FIG. 1 shows a side view and bottom view of a moving vehicle with an embodiment 100 of the current invention installed. As the vehicle is moving, ambient air is moved backward, illustrated by the arrows in the figure. The air enters the space underneath the vehicle from the front of the vehicle at a higher speed than the surrounding ambient air and exits the rear of the vehicle at a slower speed after moving through the diffuser 100. It works by accelerating the velocity of the airflow underneath the car with a design of different channels of airflow. At the diffuser's outlet, the airflow is at the same pressure and speed as the ambient air. Since its rear region is designed to expand, the exit area is much bigger than the inlet, so for the conservation of mass principle, the airflow will have a much higher speed at the diffuser inlet and as a consequence under the whole car underbody. The consequence of the increased flow speed is a reduction in pressure according to the Bernoulli's principle, and a downforce, net of ambient higher pressure and the lower pressure underneath the car. The diffuser 100 eases the high-velocity air back to normal velocity as the air exits the diffuser's channels and also helps fill in the area behind the car making the whole underbody a more efficient downforce-producing device by reducing drag on the car. The present diffuser 100 also imparts upward momentum to the air which further increases downforce.

Figure 2:
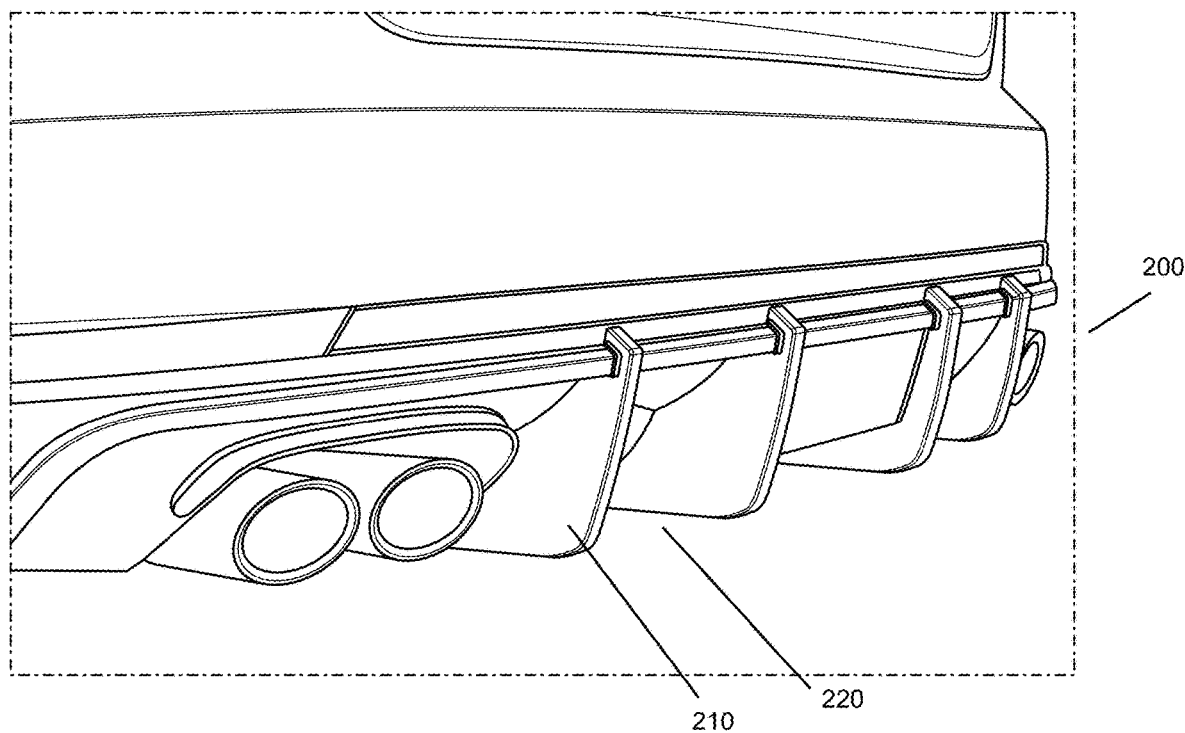
FIG. 2 illustrates a perspective view of a common diffuser.

FIG. 2 illustrates an aftermarket rear diffuser 200 attached to the rear of a car. A diffuser is commonly positioned about the back half of the car's chassis and stretches to the rear thereof. In FIG. 2, the tail of the diffuser comprises a series of fins 210 that fan out from the bottom of the car. The fins form air channels 220 between the adjacent fins. The air flows into the underbody from the front of the car, accelerates through the narrow inlet of the diffuser, and, thereby, reduces pressure under the car. Since the ambient pressure surrounding the car is higher, the net pressure difference creates a downforce that helps to stabilize the car. However, too much downforce toward the rear of the car will create drag that degrades the car's performance. Thus, the diffuser has an outlet much larger than the inlet to ease the airflow such that when the airflow exits the air channels 220, it moves at the same pace as the ambient air.

Figure 3:
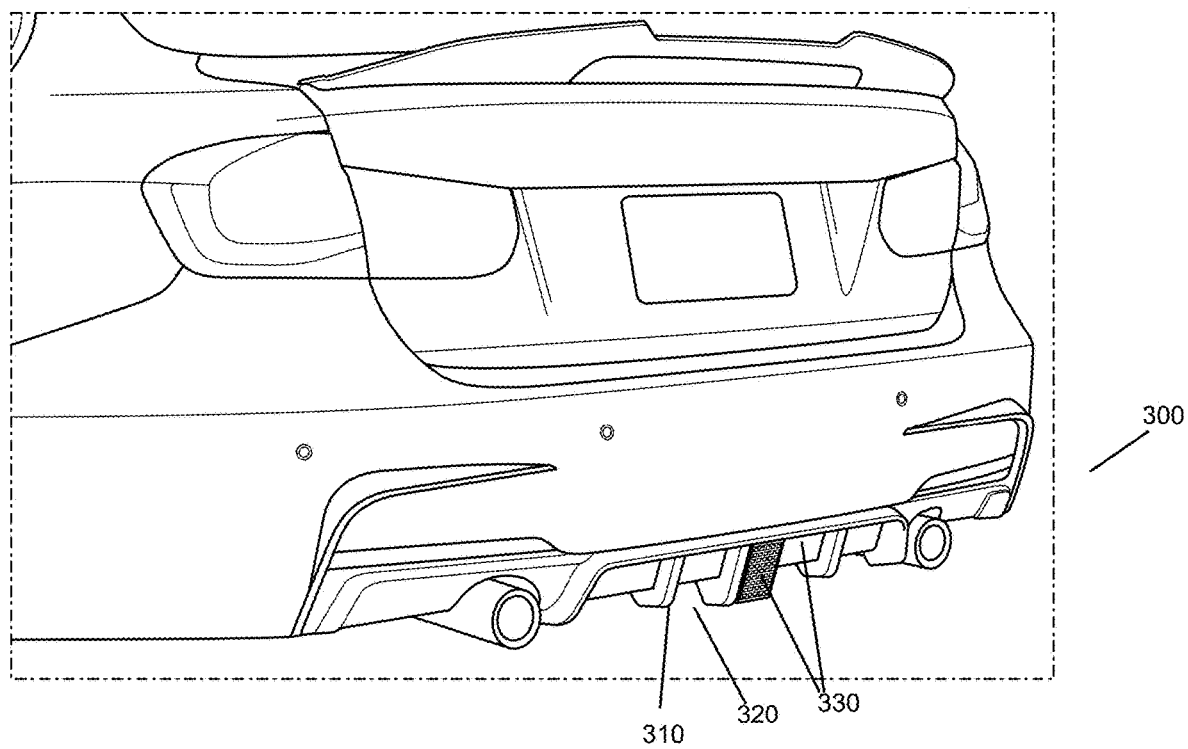
FIG. 3 illustrates an embodiment of the current invention as a rear lamp and diffuser.

FIG. 3 illustrates an embodiment 300 of the present rear light and diffuser invention attached to the rear of a car. The diffuser 300 comprises a series of fins 310 and rear light 330. The fins 310 protrude outward perpendicular to the rear light panel's surface and form a series of air channels 320 to direct airflow under the moving car. The diffuser simultaneously provides 2 utilities for the car owner: a legally-required rear light and a diffuser to improve the car's performance. It is contemplated that the rear light 300 comprises individual light reflectors that are disposed at desired positions across the diffuser 300. In another embodiment, it is contemplated that the light reflectors comprises LED light panels that are disposed contiguously across the entire diffuser's width.

Figure 4:
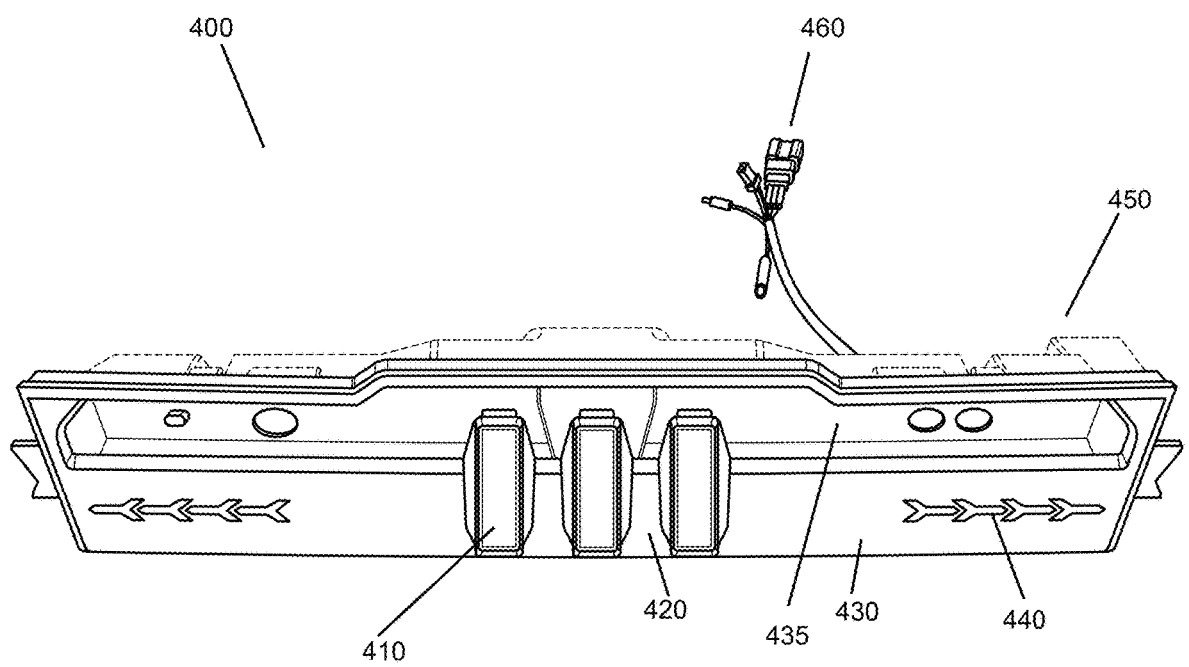
FIG. 4 illustrates a close-up front view of an embodiment of the current invention.

FIG. 4 discloses another embodiment 400 of the present rear light and diffuser invention. This diffuser 400 comprises fins 410 that form air channels 420 to direct and disperse airflow under a car. As disclosed above, the fins are designed and disposed in a fan-out design pattern such that the diffuser's inlet under the chassis is narrower than the outlet as shown in FIG. 4. The fan-out design accelerates the airflow moving through the midsection of the car and eases the airflow as it exits in the rear. The diffuser 400 further comprises a rear light's components. It comprises a light panel 430, light reflector 435, an ornamental element 440, a light housing 450, and a power cord 460. It is contemplated that the light panel can use LED or other light technologies and they can be arranged in a varieties of design pattern to improve the aesthetics of the car. Similarly, the ornamental element can be varied among different embodiments of this invention. The power cord can be fitted to accommodate different makes and models of the car.

Figure 5:
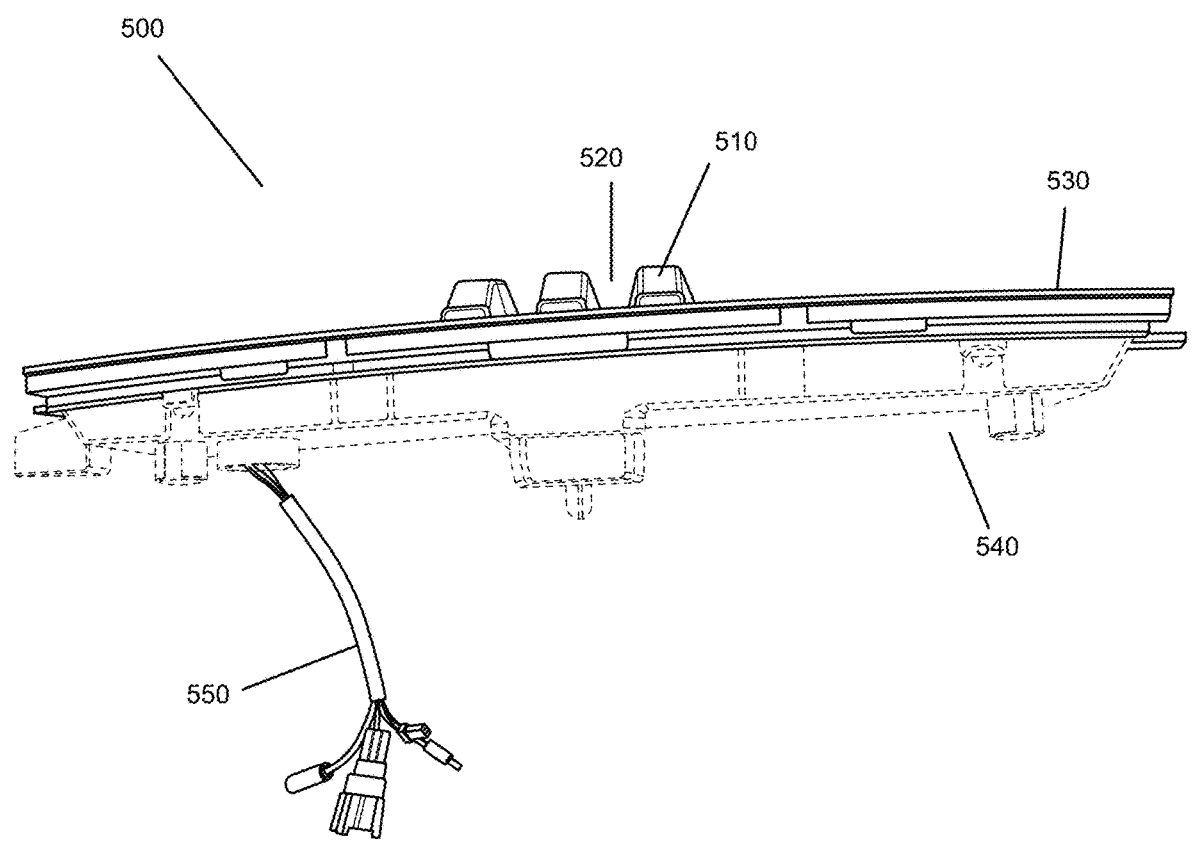
FIG. 5 illustrates a top view of another embodiment of the current invention.

FIG. 5 shows another embodiment 500 of the present rear light and diffuser invention, which comprises fins 510 and air channels 520. In this top view, the fins 510 are disposed and extended beyond the rear of the car. In a fan-out design, the angle of the diffuser fins and their configuration are crucial for efficient airflow management. The diffuser 500 further comprises a rear light 530 that is housed in a light housing 540 that is varied to fit different makes and models. The diffuser further comprises a power cord 550 to provide the rear light and diffuser the electric power needed for its functions.

Figure 6:
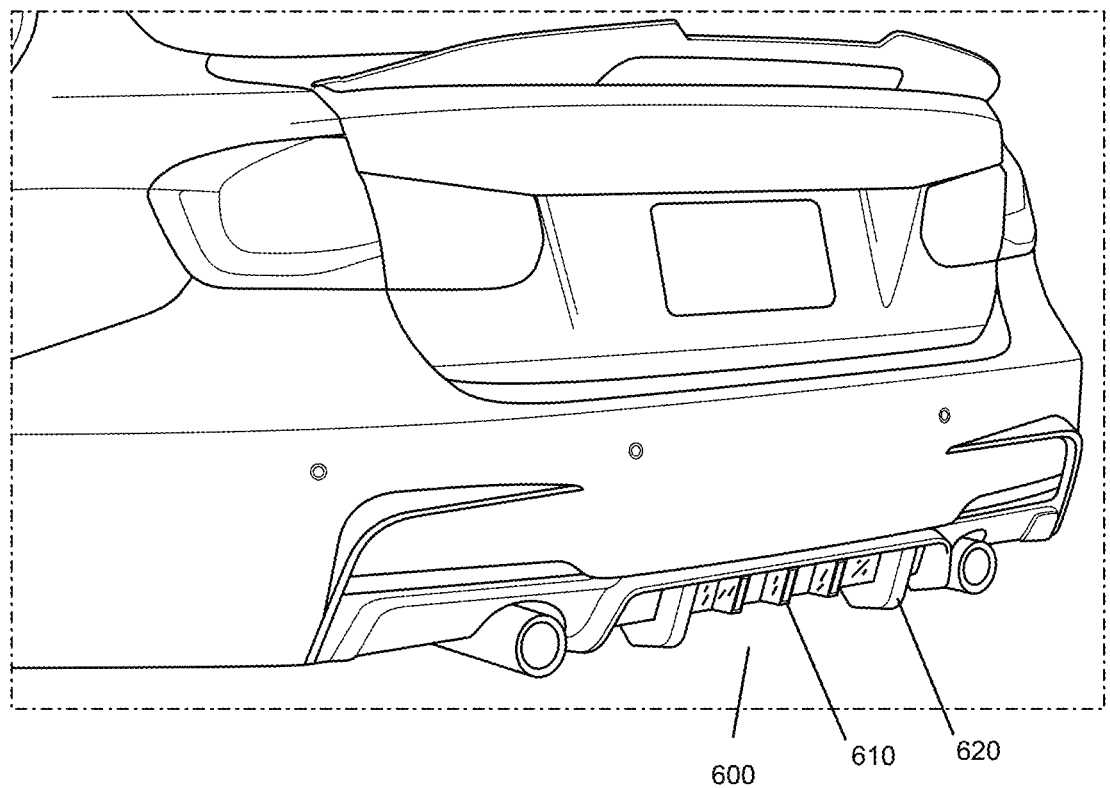
FIG. 6 illustrates another embodiment of the current invention.

FIG. 6 illustrates another embodiment 600 of the present rear light and diffuser invention where the diffuser 600 is designed to fit in the existing frame 620 of the car. The rear light and diffuser 600 comprises diffuser fins, diffuser air channels, and a rear light panel. The rear light and diffuser 600 is attached to the bumper or frame of the car using conventional fastening means.

Figure 7:
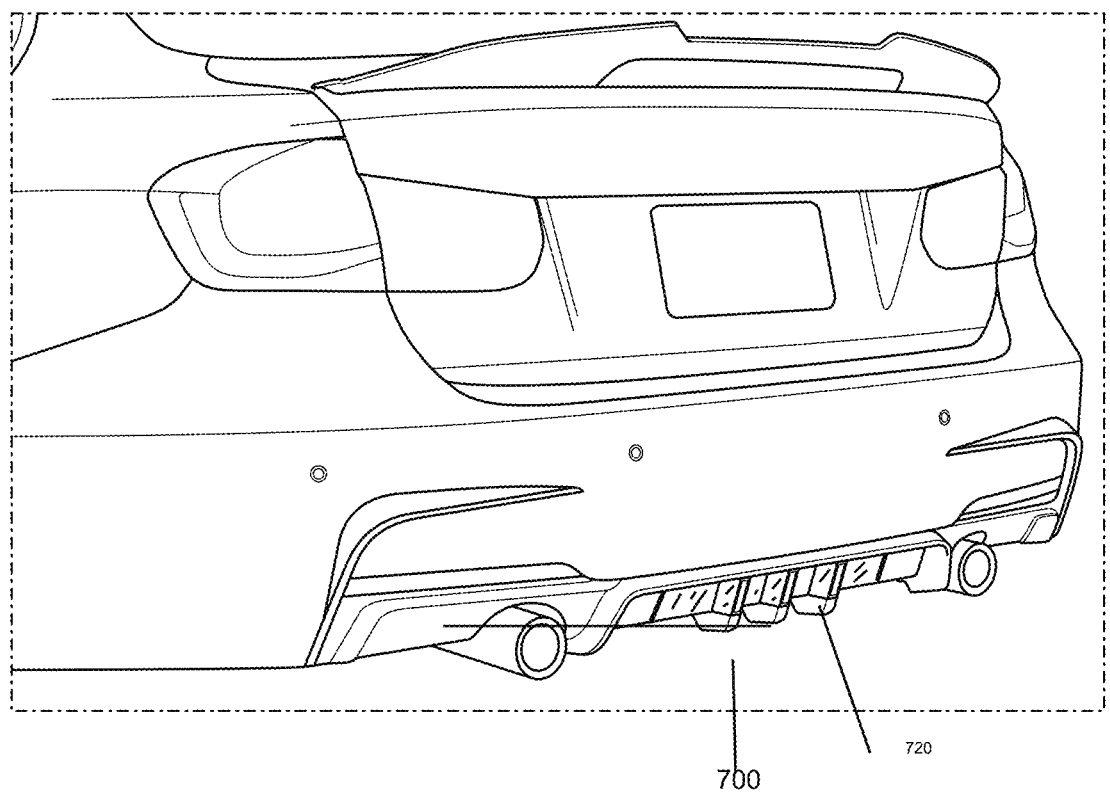
FIG. 7 illustrates another embodiment of the current invention where it is incorporated in the existing diffusing system, and sitting on top the existing diffuser.

FIG. 7 illustrates another embodiment 700 of the present rear light and diffuser invention where the diffuser 700 is designed to fit on top of an existing diffuser 720. As shown, the rear light and diffuser 700 is disposed across the rear of the car frame from the left exhaustion pipe to the right exhaustion pipe, and its diffuser fins are designed to partially cover the existing diffuser and fitted as if the two are casted in the same mold. The present diffuser 700 is attached to the car frame by the conventional screws or bolts and the existing holes on the frame.

What is claimed are:

1. A rear light and diffuser apparatus comprising:
   a housing,
   a light panel disposed on a side of said housing,
   a plurality of diffuser fins protruding substantially perpendicular to said light panel and arranged along a width of said apparatus in a fan-out configuration; and
   a power cord configured to connect to a vehicle power outlet.

2. The apparatus of claim 1, further comprising at least one of an LED light reflector, a halogen lamp reflector, or an acetylene lamp reflector.

3. The apparatus of claim 1, further comprising an ornamental element.

4. A method of manufacturing a rear light and diffuser apparatus comprising:
   providing a housing,
   providing a light panel,
   disposing said light panel on a side of said housing,
   providing a plurality of diffuser fins,
   arranging said diffuser fins to protrude substantially perpendicular to said light panel and extend along a width of said apparatus in a fan-out configuration, and
   providing a power cord configured to connect to a vehicle power outlet.

5. The method of claim 4, further comprising providing at least one of an LED light reflector, a halogen lamp reflector, and/or an acetylene lamp reflector.

6. The method of claim 4, further comprising providing an ornamental element.

* * * * *